United States Patent [19]

Kertesz

[11] Patent Number: 5,671,780
[45] Date of Patent: Sep. 30, 1997

[54] MULTILAYER FLEXIBLE CONDUIT

[75] Inventor: Janos Kertesz, Hofheim, Germany

[73] Assignee: Rasmussen GmbH, Maintal, Germany

[21] Appl. No.: 591,164

[22] Filed: Jan. 16, 1996

Related U.S. Application Data

[63] Continuation of Ser. No. 152,591, Nov. 15, 1993, abandoned.

[30] Foreign Application Priority Data

Nov. 17, 1992 [DE] Germany .................. 42 38 606.3

[51] Int. Cl.$^6$ ................................................ F16L 11/10
[52] U.S. Cl. .................. 138/127; 138/141; 138/137; 138/143; 138/139
[58] Field of Search .................. 138/127, 141, 138/125, 137, 138, 139, 143; 252/609

[56] References Cited

U.S. PATENT DOCUMENTS

| | | | |
|---|---|---|---|
| 2,723,777 | 11/1955 | Amtsberg | 218/45 |
| 3,557,840 | 1/1971 | Maybee | 138/149 |
| 3,838,588 | 10/1974 | Johnson | 72/114 |
| 3,988,188 | 10/1976 | Johansen et al. | 138/125 |
| 3,990,479 | 11/1976 | Stine et al. | 138/125 |
| 4,101,699 | 7/1978 | Stine et al. | 138/141 |
| 4,140,114 | 2/1979 | Moore et al. | 138/112 |
| 4,181,157 | 1/1980 | DeCamp | 138/126 |
| 4,216,802 | 8/1980 | Bonnes et al. | 138/145 |
| 4,216,803 | 8/1980 | Hall | 138/143 |
| 4,559,782 | 12/1985 | Ritchey et al. | 138/125 |
| 5,015,514 | 5/1991 | Rinehart | 138/140 |
| 5,070,597 | 12/1991 | Holt et al. | 138/103 |
| 5,324,558 | 6/1994 | Muto et al. | 138/129 |
| 5,413,828 | 5/1995 | De Keyser | 252/609 |

FOREIGN PATENT DOCUMENTS

| | | |
|---|---|---|
| WO 93/22081 | 4/1993 | European Pat. Off. . |
| 1 449 755 | 8/1966 | France . |
| 2 274 377 | 1/1976 | France .................. B21J 15/26 |
| 24 53 238 | 11/1974 | Germany . |
| 39 42 354 A 1 | 12/1989 | Germany . |
| 58-59832 | 4/1983 | Japan . |
| 58-114979 | 8/1983 | Japan . |
| 3-29322 | 3/1991 | Japan . |
| 2 098 528 | 11/1982 | United Kingdom ............ B23P 19/00 |
| 2 140 727 | 5/1984 | United Kingdom ............ B25B 21/00 |

Primary Examiner—David Scherbel
Assistant Examiner—James F. Hook
Attorney, Agent, or Firm—Darby & Darby

[57] ABSTRACT

Pursuant to the invention, this objective is accomplished by a multilayer flexible conduit for combustible liquids, particularly for fuels, with an outer layer, an inner pipe and an intermediate layer between the outer layer and the inner pipe. The outer layer comprises a halogen-free and phosphorus-free thermoplastic material. The intermediate layer is made of synthetic fibers that are resistant to high temperatures, a fire-resistant textile yarn or metal fibers. The inner pipe has at least one diffusion-tight layer of a thermoplastic material.

3 Claims, 1 Drawing Sheet 5,671,780

MULTILAYER FLEXIBLE CONDUIT

This is a continuation of application Ser. No. 08/152,591, filed Nov. 15, 1993 now abandoned.

FIELD OF INVENTION

The invention relates to a multilayer flexible conduit for combustible fluids, particularly fuels, with an outer layer, an inner pipe and an intermediate layer between the outer layer and the inner pipe.

BACKGROUND OF THE INVENTION

The DE-39 42 353 A1 describes a multilayer pipe in which a flame retardant additive is contained in the outer layer. The intermediate layer is constructed as a braiding, which is intended to contribute to the mechanical strength of the multilayer structure. The inner part consists of two layers of a thermoplastic synthetic material, which are connected positively to one another and one of which is cross linked by radiation.

OBJECTS OF THE INVENTION

It is an object of the invention to provide a multilayer flexible conduit with superior fire resistance compared to the multilayer conduits of the prior art.

It is another object of the present invention to provide a flexible conduit which is less permeable to fluids than prior art designs.

It is yet another object of the present invention to provide a flexible conduit which is made of materials less hazardous to the environment.

SUMMARY OF THE INVENTION

Pursuant to the invention, this objective is accomplished by a multilayer flexible conduit for combustible fluids, particularly for fuels, with an outer layer, an inner pipe and an intermediate layer between the outer layer and the inner pipe. The outer layer comprises a halogen-free and phosphorus-free thermoplastic material. The intermediate layer is made of synthetic fibers that are resistant to high temperatures, a fire-resistant textile yarn or metal fibers. The inner pipe has at least one diffusion-tight layer of a thermoplastic material.

The outer layer of the present invention ensures that the flexible conduit, in the event of a fire, does not itself maintain or support the fire and, instead, causes the fire to be extinguished. The fire is extinguished without endangering the environment since the formation of toxic phosphates or halogen compounds, especially the formation of highly toxic dioxins, which can result from combustion of chlorine-containing organic compounds, is precluded. The intermediate layer acts as a pressure support and, at the same time, is difficult to ignite, but does not affect the flexibility of the multilayer conduit. The inner pipe primarily prevents the escape of the fluid by diffusion.

BRIEF DESCRIPTION OF THE DRAWINGS

The invention and its further developments will be described in greater detail below with the help of the drawing of preferred embodiments, in which.

DETAILED DESCRIPTION OF THE INVENTION

Figure 1:
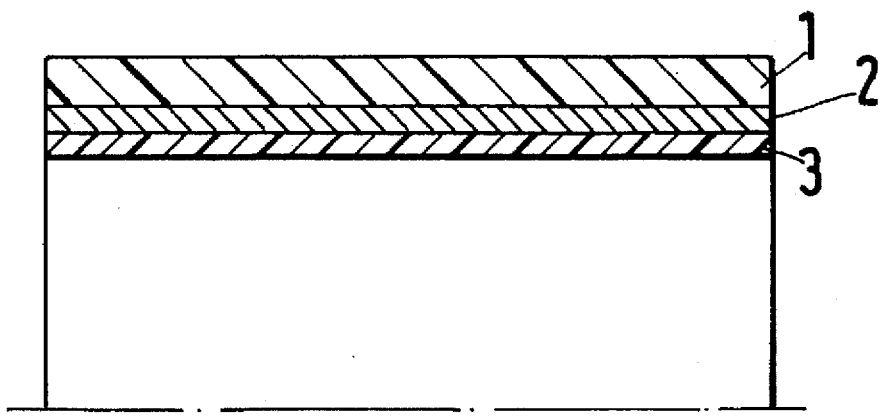
FIG. 1 shows half of a longitudinal section through a first embodiment of the multilayer flexible conduit of the present invention.

The outer layer of the flexible conduit of the present invention may be constructed of a wide range of materials, but it is preferably made of a radiation cross-linked thermoplastic compound with excellent impact resistance, to which a flame retardant has been added to prevent the evolution of smoke. The flame retardant preferably contains at least one mineral, particularly aluminum hydroxide, magnesium hydroxide, or a mixture thereof. The time retardant is also free of halogens and phosphorus, which may produce toxic compounds during combustion.

Aluminum hydroxide and magnesium hydroxide are flame retardants, which are neither toxic nor corrosive. The time-retardant effect exhibited by these materials is based on the endothermic decomposition of the hydroxides into the corresponding oxides and water vapor. This endothermic effect leads to a lowering of the temperature to below the ignition temperature of the polymer. The decomposition product forms a protective vapor layer and thus dilutes the oxygen in the gas phase, which is necessary for combustion. Surface-active aluminum oxide or magnesium hydroxide intermediates with higher absorbing power prevent the formation of high smoke density.

The use of the aforementioned time retardants makes possible the production of fuel conduits with a time-protected outer layer. In the event of a fire, such pipes burn through after only several minutes (depending on the wall thickness and the temperature) and evolve only slight amounts of smoke.

For example, automobile manufacturers demand a fire resistance of two minutes at 750°–800° C. when the outer layer of a fuel hose is exposed directly to the flame of a Bunsen burner and the hose is subjected to an internal pressure of 4 bar. During these two minutes, there must be no leakage. The outer layer of the present invention potentially improves the required fire resistance of two minutes by a factor of at least two, and possibly of three. The very high degree of filling with the flame retardant, as well as the crosslinked structure of the outer layer, lessens the danger that droplets of the thermoplastic compound will form to more rapidly spread the fire.

The synthetic fibers of the intermediate layer of the present invention, which are able to withstand high temperatures, may be constructed of a wide range of materials. For example, the intermediate layer may be made of an incombustible textile yarn, such as an asbestos-free insulating yarn, or of metal wires. Polyamide fibers, particularly aramid fibers, or polyester fibers are preferred. Fibers of 1,4-phenyleneterephthalamide are particularly resistant to high temperatures, and are the most preferred fibers for use in the intermediate layer of the present invention.

The inner pipe can consist of a single inner layer, which simplifies the manufacture of the multilayer structure. It is, however, also possible to construct the inner pipe as a multilayer pipe, which provides greater flexibility in selecting optimum materials for a particular application.

The inner pipe preferably consists of a single layer of thermoplastic material which prevents diffusion of the transported fluid, which is referred to for the purposes of the present invention as a "diffusion-tight" layer. Nylon 6, nylon 11 and nylon 12 are particularly suitable for use as the thermoplastic material of the inner pipe. Preferably, the thermoplastic material of the inner pipe is radiation cross-linked, particularly with $\gamma$ or $\beta$ radiation. The material of the inner layer can, however, also be a fluorinated thermoplastic material, such as ETFE (ethylene/tetrafluoroethylene) or PVDF (polyvinylidene fluoride).

Most preferably, the inner pipe of the multilayer flexible conduit of the present invention consists of five layers, an outer and an inner thermoplastic layer, a middle layer of aluminum and in each case a bonding agent layer between the middle layer and the outer layer as well as between the middle layer and the inner layer. The outer layer can be easily connected to the intermediate layer, while the inner layer can also be constructed as a diffusion barrier.

As noted above, the thermoplastic materials making up the layers of the present invention are preferably cross linked. Cross-linking decreases the swellability and solubility of the thermoplastic material in organic solvents, particularly in the presence of oil or gasoline, as well as the tendency of such materials to form tension cracks. In addition, it increases the ability to withstand high temperatures, the tensile strength, the modulus of elasticity, the impact strength and the hardness of the material.

Cross-linking with γ radiation or β radiation, which is suitable for a larger number of thermoplastic materials than is thermal cross-linking, is preferred for use in the forming the layers of the present invention. This makes it possible to select from larger number of different materials on the basis of the particular application.

The present invention is further illustrated by the following examples of its practice.

The multilayer flexible conduit illustrated in FIG. 1 has an outer layer 1, an intermediate layer 2 and an inner pipe 3. The outer layer 1 is constructed of a halogen-free and phosphorus-free self-extinguishing, thermoplastic material. The preferred thermoplastic material is an γ or β radiation cross-linked, thermoplastic compound of elastomers, to which a flame retardant has been added and which does not evolve a great deal of smoke. The flame retardant is also free of halogens and phosphorus, and aluminum hydroxide, magnesium hydroxide, or a mixture thereof are preferred. The elastomeric, thermoplastic material of the outer layer has a high impact strength.

The intermediate layer 2 consists of synthetic fibers, which are resistant to high temperatures. These fibers are preferably of a fire-resistant textile yarn, or of metal wires. These synthetic fibers are preferably aramid or polyester fibers, with fibers of 1,4 phenyleneterephthalamide being particularly preferred. The intermediate layer can also be an asbestos free insulating yarn.

The inner pipe consists of a single, diffusion-preventing layer of thermoplastic material. Nylon 6, nylon 11 and nylon 12 are particularly suitable, preferably, radiation cross-linked with γ or β radiation. The material of the inner layer can, however, also be a fluorinated thermoplastic material, such as ETFE (ethylene/tetrafluoroethylene) or PVDF (polyvinylidene fluoride).

The multilayer flexible conduit of FIG. 1 is suitable particularly for use in motor vehicles as fuel pipe, coolant pipe or oil pipe. It substantially fulfills the requirements of environmental protection laws and prevents or minimizes the so-called evaporation emission values, particularly of fuels. At the same time, it offers a solution that is inexpensive compared to hoses of PTFE (polytetrafluoroethylene). Furthermore, it contributes to reducing the danger of fire in the engine area of a motor vehicle. Due to the diffusion-resistant inner layer, the escape particularly of carcinogenic materials, such as benzene, is prevented. In the case of a fire, the evolution of very little smoke is ensured. The materials can be recycled. The danger of embrittlement is also avoided. Moreover, the multilayer conduit is extremely resistant to buckling, incombustible and stable at elevated temperatures.

Figure 2:
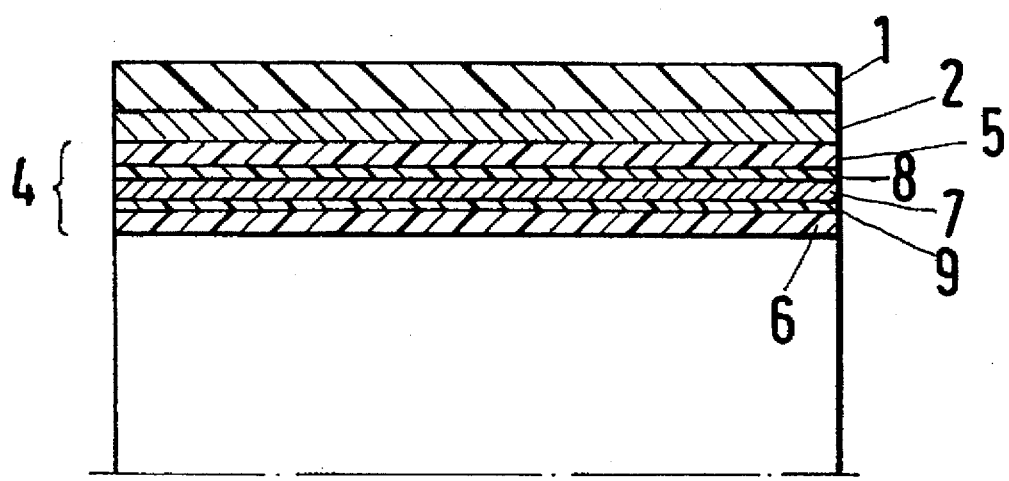
FIG. 2 shows half of a longitudinal section through a second embodiment of the present invention.

In the embodiment of FIG. 2, the outer layer 1 and the intermediate layer 2 are constructed as in the embodiment of FIG. 1. However, in FIG. 2 the inner pipe 4 is a multilayer pipe of five layers, an outer thermoplastic layer 5 and an inner thermoplastic layer 6, a middle layer 7 of aluminum and a bonding agent layer 8 between the middle layer 7 and the outer layer 5, as well as a bonding agent layer 9 between the middle layer 7 and the inner layer 6. The outer layer 5 and the inner layer 6 may consist of the same material as the outer layer 1.

The multilayer construction of the inner pipe 4 enables a more unrestricted selection of optimum materials to be made for the particular application. In addition, the aluminum layer 7 acts as a diffusion barrier and increases the ability to withstand fires, as well as the mechanical tensile strength. The outer layer 5 can easily be combined with the intermediate layer 2, while the inner layer 6 also can be constructed as a diffusion barrier.

The invention has been described in detail with particular reference to preferred embodiments thereof, but it will be understood that variations and modifications can be effected within the spirit and scope of the invention.

What is claimed is:

1. A multilayer flexible conduit for combustible fluids, comprising an outer layer, an inner pipe and an intermediate layer between the outer layer and the inner pipe; the outer layer comprising a halogen-free and phosphorus-free thermoplastic material including magnesium hydroxide as a flame retardant; the intermediate layer comprising a material selected from the group consisting of a) synthetic fibers that are resistant to high temperatures and selected from the group consisting of polyamide fibers and 1,4-phenyleneterephthalamide fibers, b) a fire-resistant textile yarn and c) metal wires; and the inner pipe being a multilayer pipe comprising an outer and an inner thermoplastic layer, a middle layer of aluminum and an adhesion promoting layer between the middle layer and the outer layer, and between the middle layer and the inner layer; the thermoplastic material in said outer layer being cross linked by radiation selected from the group consisting of γ radiation and β radiation.

2. The multilayer conduit of claim 1, in which the intermediate layer comprises aramid fibers.

3. The multilayer conduit of claim 1, in which the fire resistant textile yarn is selected from asbestos-free insulating yarns.

\* \* \* \* \*